United States Patent
Broussely et al.

[11] Patent Number: 6,033,795
[45] Date of Patent: Mar. 7, 2000

[54] ELECTROCHEMICAL CELL WITH IMPROVED SAFETY

[75] Inventors: Michel Broussely, Liguge; Pascal Flament, Bordeaux, both of France

[73] Assignee: Alcatel, Paris, France

[21] Appl. No.: 09/045,790

[22] Filed: Mar. 23, 1998

[30] Foreign Application Priority Data

Mar. 24, 1997 [FR] France ................................. 97 03542
Oct. 23, 1997 [FR] France ................................. 97 13287

[51] Int. Cl.$^7$ .................................................. H01M 2/12
[52] U.S. Cl. .......................... 429/56; 429/94; 429/231.1; 429/231.8
[58] Field of Search .................... 429/208, 186, 429/94, 131, 146, 147, 148, 56, 231.1, 231.8; 29/623.1

[56] References Cited

U.S. PATENT DOCUMENTS

| | | | |
|---|---|---|---|
| 2,487,499 | 11/1949 | Webb ........................................ | 429/94 |
| 3,119,722 | 1/1964 | Tietze et al. . | |
| 4,565,752 | 1/1986 | Goebel et al. . | |
| 5,017,442 | 5/1991 | Watanabe et al. ......................... | 429/94 |
| 5,384,212 | 1/1995 | Heiman et al. ...................... | 429/186 X |
| 5,418,084 | 5/1995 | Georgopoulos ........................ | 429/56 X |
| 5,474,859 | 12/1995 | Takeuchi et al. . | |
| 5,525,437 | 6/1996 | Freluche et al. ....................... | 429/94 X |

FOREIGN PATENT DOCUMENTS

| | | |
|---|---|---|
| 0 660 431 A1 | 6/1995 | European Pat. Off. . |
| 0 698 933 A1 | 2/1996 | European Pat. Off. . |
| 2 699 005 B1 | 6/1994 | France . |
| 1 011 491 | 7/1957 | Germany . |
| 42 41 037 C1 | 4/1994 | Germany . |

OTHER PUBLICATIONS

Patent Abstracts of Japan, vol. 097, No. 004, Apr. 30, 1997 corresponding to JP 08 329958 A (Fuji Electrochem Co Ltd) Dec. 13, 1996.

Patent Abstracts of Japan, vol. 005, No. 141 (E–073), Sep. 5, 1981 corresponding to JP 56 078077 A (Shin Kobe Electric Mach Co Ltd) Jun. 26, 1981.

Patent Abstracts of Japan, vol. 096, No. 007, Jul. 31, 1996 corresponding to JP 08 064198 A (Ship & AMP; Ocean Zaidan; Fuji Electrochem Co Ltd) Mar. 8, 1996.

*Primary Examiner*—Maria Nuzzolillo
*Assistant Examiner*—Susy Tsang
*Attorney, Agent, or Firm*—Sughrue, Mion, Zinn, Macpeak & Seas, PLLC

[57] ABSTRACT

The present invention provides a sealed electrochemical cell comprising a container containing a spiral-wound electrochemical group and at least one safety device for the event of a rise in internal pressure, wherein said safety device comprises gas vent first means allowing gas to escape to the outside of said container in the event of internal pressure rising, co-operating with holding second means for holding said group inside said container and organized so as to create a gap between said group and the inner wall of said container to allow said gas to flow.

17 Claims, 3 Drawing Sheets

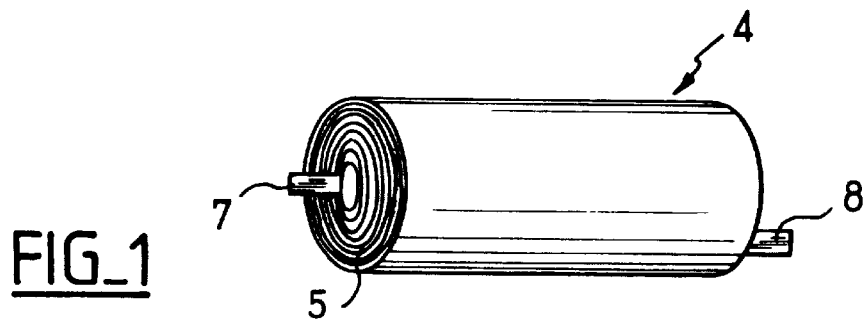
FIG_1
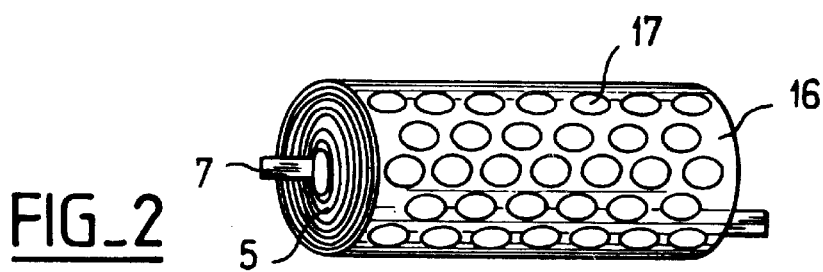
FIG_2
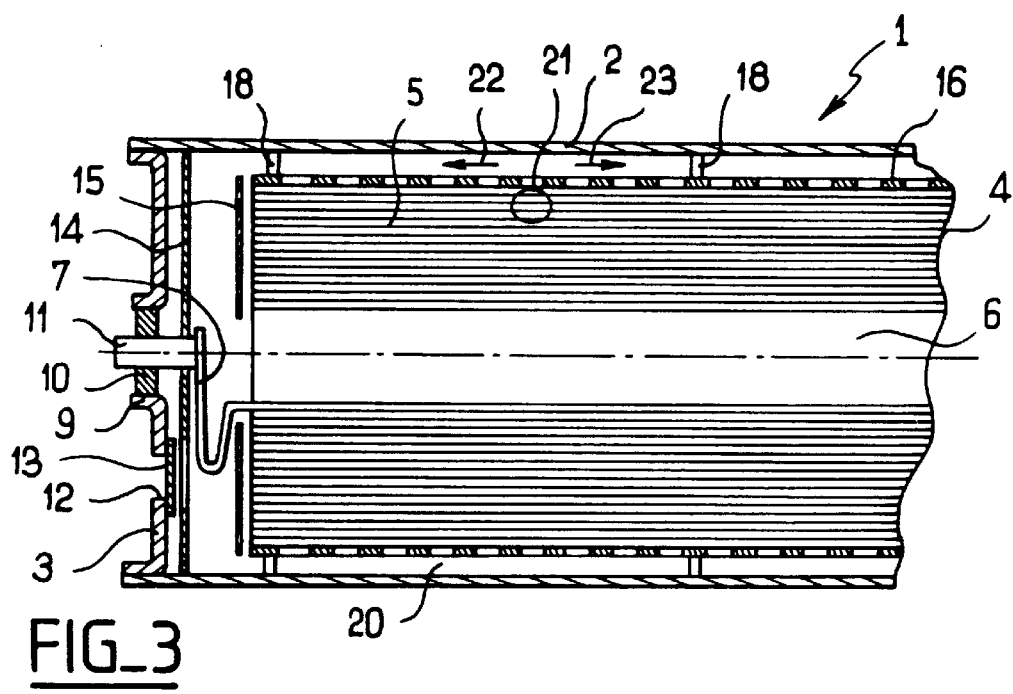
FIG_3
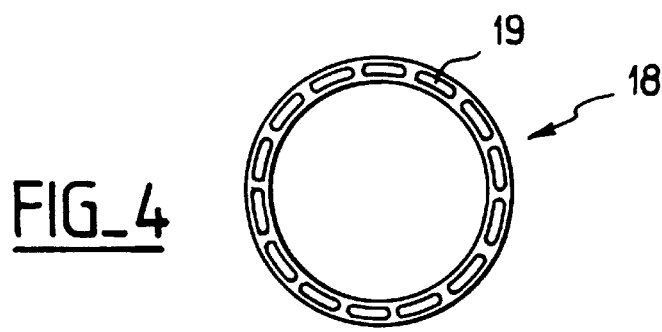
FIG_4

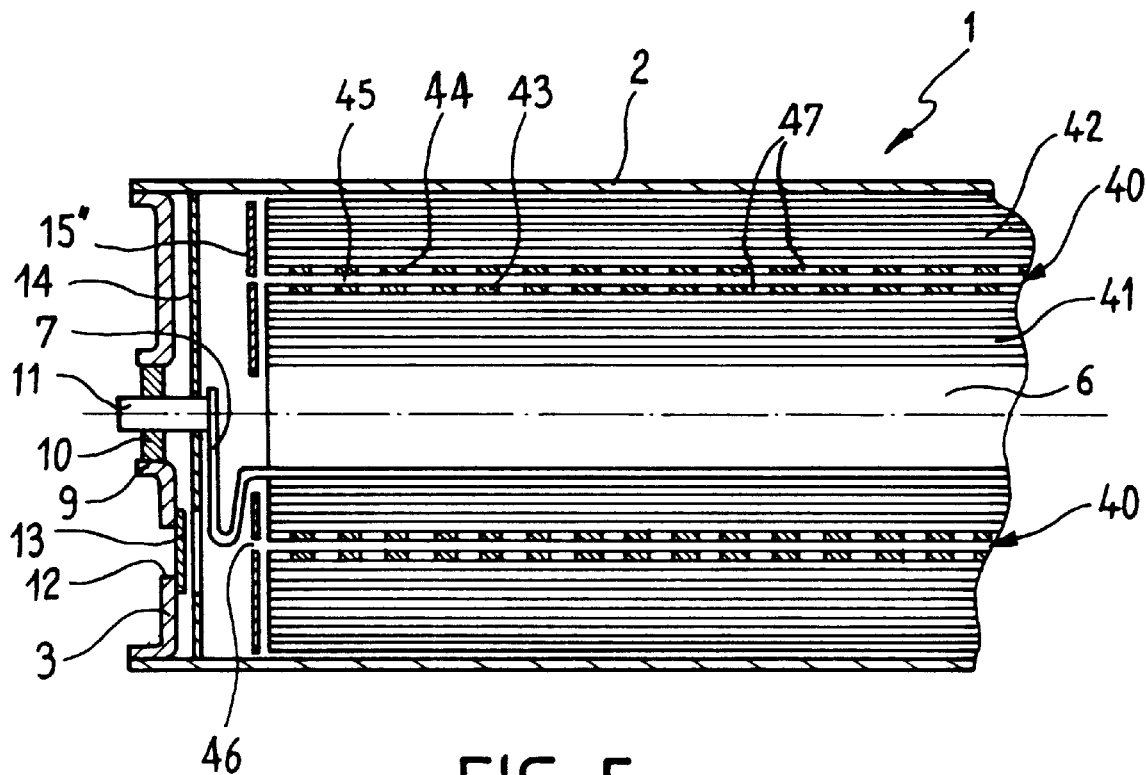
FIG_5
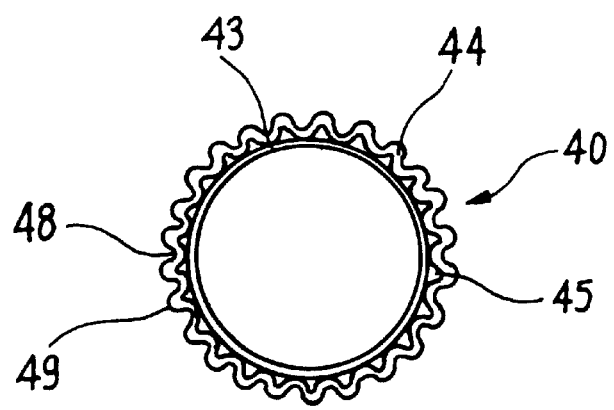
FIG_6

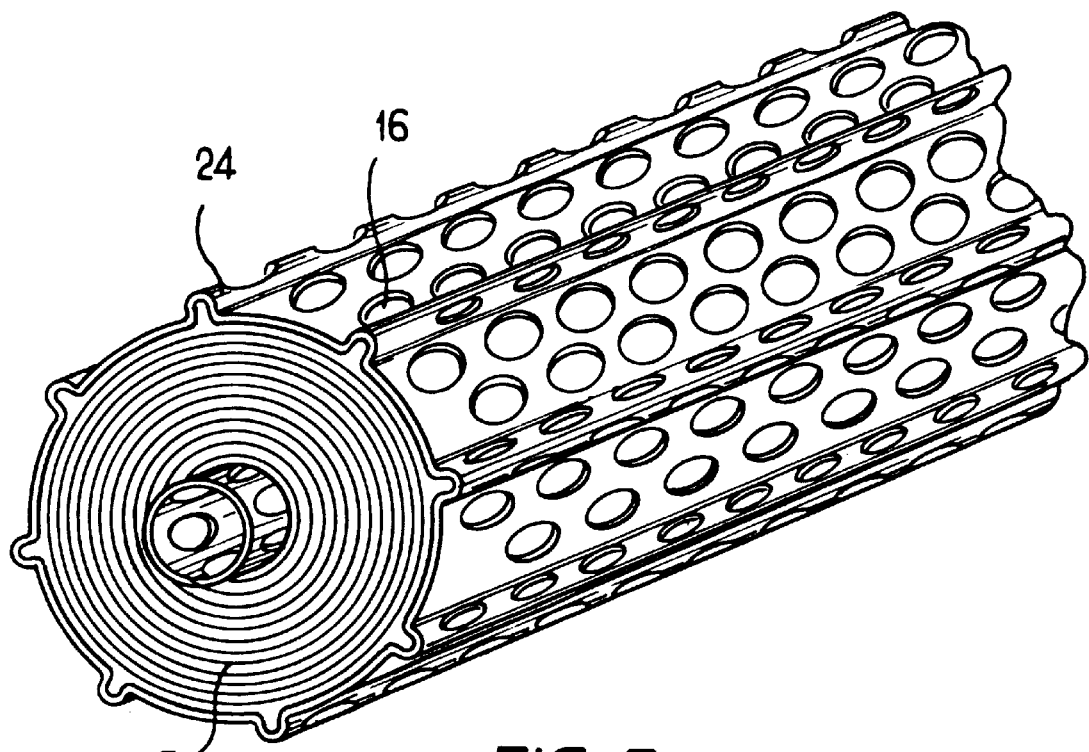
FIG_7
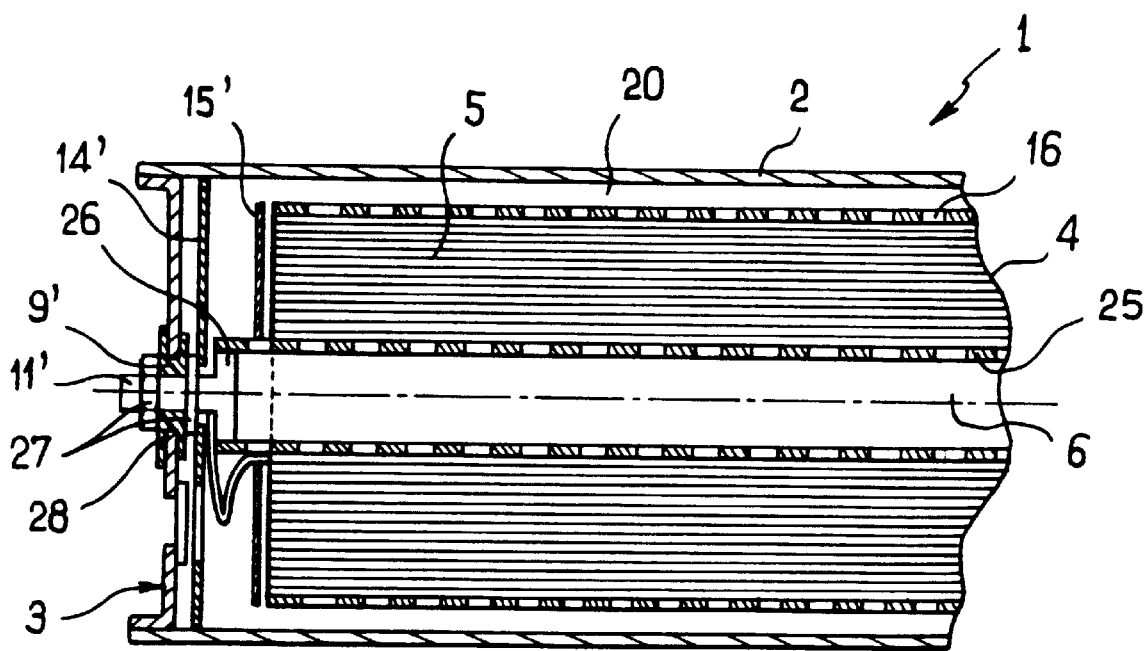
FIG_8

ELECTROCHEMICAL CELL WITH IMPROVED SAFETY

FIELD OF THE INVENTION

The invention relates to an electrochemical cell comprising a container containing an electrochemical group constituted by spiral-wound electrodes and at least one safety device for allowing gas to escape in the event of an abnormal increase of internal pressure due to faulty operation of the cell.

The invention relates to any type of electrochemical cell having spiral-wound electrodes, in particular a cylindrical cell, whether primary or secondary, and containing reagents that are capable of producing highly exothermal reactions. It is suitable for all kinds of application, however it is particularly suitable for storage cells of large dimensions which constitute a greater risk because they contain a greater amount of energy.

BACKGROUND OF THE INVENTION

Electrochemical cells are constituted essentially by two materials, one of which oxidizes (the positive electrode) and the other reduces (the negative electrode). These materials react together to deliver reaction products and energy. In normal operation, the electrochemical reaction takes place via the electrolyte and the energy is recovered in the form of electricity. The temperature of a storage cell may rise locally for accidental reasons, e.g. in the event of an internal electrical short circuit. If the local temperature in a storage cell becomes too high, e.g. greater than 250° C. for a lithium cell, then the materials can react with their environment in exothermal manner, at a speed that depends on temperature and pressure. In the worse case, if the heat produced cannot be evacuated quickly, then a thermal runaway phenomenon occurs and the entire storage cell is subjected to combustion on a short or very short time scale. This reaction can be very fast, producing a large quantity of gas, thereby bursting the metal envelope of the storage cell if it was not provided with a safety valve (this phenomenon is often referred to as an "explosion"). Under such circumstances, it is necessary in the event of thermal runaway occurring to ensure that the speed of reaction is as slow as possible, in particular to avoid pressure rising excessively at the reaction front, thereby making it as easy as possible for the gas to be vented via the safety valve.

Prior art solutions applied to electrochemical cells relate only to weakening the outer envelope for the purpose of enabling it to open at a determined pressure that is lower than the bursting pressure of the envelope itself.

Thus, document FR-A-2 627 327 discloses a device constituted by a V-shaped groove formed in the bottom of the container, thereby leading to a thinning of the wall. A safety valve is situated at the end (or ends) of the spiral-wound group, in the cover or the bottom of the container. In the event of the electrodes being subject to combustion halfway along the spool, the gas produced cannot be evacuated. Pressure rises strongly, thereby accelerating the chemical reactions and the combustion of the electrodes. The situation becomes catastrophic and can lead to the envelope bursting, since the vent is insufficient for evacuating all of the gas that is given off.

According to document EP-A-0 305 880 a line of weakness describing a multiple tongue is formed in the bottom of the container.

In document WO-A-82/02117, the alkaline magnesium cell described has two envelopes, the inner envelope being sealed. The outer envelope may include ribs on its inside face.

Finally, document JP-A-60 200 56 describes a cylindrical alkaline battery including a safety valve and a V-shaped rib constituting a zone of weakness.

In none of those documents is anything described that makes it easier to collect gas inside the electrochemical cell and bring it to the vicinity of the vent device. Unfortunately, particularly with cells of large size, the gases that are produced very fast during combustion at the reaction front (electrodes) cannot easily be evacuated through the spiral-wound electrode group itself, given its geometrical configuration. This applies in particular to cells of cylindrical shape (generally, but not necessarily of circular base), since the envelope is mechanically very strong and does not deform under the applied pressure, as can happen with a cell that is of prismatic shape.

It should be observed that document EP-A-0 244 261 describes an electrolytic capacitor in which the diameter of the active portion (coil) is smaller than the inside diameter of the envelope. The coil is free and is held inside the envelope by its connections only, which is not possible for a primary or a secondary cell, given the greater density of its electrodes and the constraints concerning resistance to vibration and shock. In addition, with a capacitor, there is no electrolyte and the electrodes are secured to each other by means of a resin. That is not the case of an electrochemical cell which requires an envelope to hold the electrodes in place. Finally, that document which recommends filling the container with solidified resin says nothing about providing space to allow gas to escape under such conditions.

OBJECT AND SUMMARY OF THE INVENTION

The object of the invention is to provide an electrochemical cell having spiral-wound electrodes that enables gas to be exhausted more easily and more quickly, i.e. that leads to greater safety for the user.

The invention provides a sealed electrochemical cell comprising a container containing a spiral-wound electrochemical group and at least one safety device for the event of a rise in internal pressure, wherein said safety device comprises gas vent first means allowing gas to escape to the outside of said container in the event of internal pressure rising, co-operating with holding second means for holding said group inside said container and organized so as to create a gap between said group and the inner wall of said container to allow said gas to flow.

Said second means serves to collect the gas produced and to convey it to the vicinity of said device.

As a general rule the cell is cylindrical in shape, generally, but not necessarily, having a base that is circular, and the electrodes are spiral-wound in the form of a cylindrical electrochemical group or spool.

In a first embodiment of the invention, said second means consist in a device for containing said group inside said gas-permeable container and organized in such a manner as to create between the outer surface of said group and the inner wall of said container a gap that puts at least a portion of said outer surface into communication with said vent device.

Said confinement device may consist in a perforated envelope enclosing the group, thereby allowing the gas to pass.

Thus, in accordance with the invention, a cell is made within a double-walled envelope. The inner envelope is not leakproof. For example, over its entire surface it possesses orifices for allowing gas to escape into an empty volume, leading to the portion of the outer envelope that possesses a safety vent.

The inner envelope also has the function of holding the group constituted by the rolled-up electrodes and a separator. This function ensures that the cell operates properly by maintaining mechanical pressure that keeps the electrodes in contact with each other through the separator, and thus maintaining electrical continuity. The shape and number of the gaps, and the thickness of the envelope are selected so as to provide a compromise between mechanical strength and ease of evacuating gas.

In addition, the fact of having a simple inner envelope of this type can make it possible to improve the mechanical pressure exerted on the group. The diameter of the spool needs to be slightly smaller than the inside diameter of the envelope containing it so as to enable it to be inserted easily, and that puts a limit on the pressure that can be exerted. In the method of the invention, it is easy to swage the envelope containing the spool diametrically using an appropriate tool so as to exert mechanical pressure on the spool. In contrast, it is much more difficult to perform that operation on a prior art outer envelope which includes the closure cups, the terminals, and the safety vent.

The (prior art) outer envelope serves essentially to ensure that the cell is sealed. It has insulated outlet terminals and safety devices such as the above-mentioned vent. Compared with the prior situation, it no longer needs to hold the electrodes mechanically together since that function is provided by the inner envelope. As a result its mechanical strength can be less, and that is advantageous on safety grounds: if the envelope is going to burst in spite of everything, then the effects of bursting will be reduced. By way of example, it can be made of plastics material, thus having the advantage of decreasing the mass of the storage cell as well as its cost. If the plastics material is appropriately selected, it can melt at a temperature that is lower than the temperature at which dangerous exothermal reaction takes place, while still remaining greater than the expected maximum temperature of use (e.g. 130° C.), thus avoiding any risk of the envelope exploding. This property is of use when heating comes from an external source of heat.

The outer envelope can be provided with mechanical weakness (e.g. a thin portion along a generator line) such that in the extreme event of the envelope bursting, the effects it produces on the environment are diminished.

In order to keep the position of the inner envelope stable relative to the outer envelope, it is advantageous for the holding apparatus to comprise a system of spacers disposed between the device for confining the group and the inside wall of the container while not impeding the flow of gas in the gap between the two envelopes. To ensure that the empty gap is uniformly distributed, the envelopes must be coaxial.

The spacers may comprise perforated radial rings and/or longitudinal spacers. One or both kinds can be integral with the confinement device constituted by the inner envelope, e.g. in the form of radial or longitudinal folds in the perforated sheet constituting the envelope. As a replacement for or in association with external spacing of the group, the group holding apparatus may comprise a central mandrel together with means for securing the ends of the mandrel to the enclosure cups of the container.

The inner envelope may be made of metal or of plastic, it may be in the form of a sheet or a grid, and it can have openings of arbitrary shape. The envelope can be made easier to put into place if it is constituted by a perforated heat-shrink sheath.

In an embodiment of the invention, said confinement device and said container are connected to two opposite poles, with an insulating film being provided on the inside surface of said container.

Although the invention is particularly advantageous for circularly cylindrical cells, it is nevertheless not limited to that application only.

In spite of having two envelopes, it will be observed that the solution of the invention is not necessarily heavier than a prior art solution, since separating the functions to be performed by each of the two envelopes means that the thickness of the outer envelope can be greatly reduced, and the inner envelope has perforations.

When faulty operation of the cell leads to local combustion, gas is generated over a zone of electrode area that may be found in the core of the thickness of the electrode group. Under such circumstances, evacuation of the gases is particularly slow and difficult, particularly with high capacity cells of large diameter. In order to avoid gas accumulating inside the group which could run the risk of causing a violent explosion, means are installed close to the site where gas is given off for the purpose of collecting the gas and leading it to the vent device.

In a second embodiment of the invention, said second means is constituted by at least one gas-permeable hollow structure in the form of a cylinder that is coaxial with said group, and organized so as to establish within the thickness of said group a gap that allows at least a portion of the surface area of said electrodes to be put into communication with said vent device. The empty gap is thus uniformly distributed in radial symmetry within the core of the group.

This structure can be made of an insulating material such as a plastics material. If it is also desired to improve heat exchange within the group, then a metal structure should be selected and connected to one of the poles. The number of structures to be inserted within the group and/or the thickness thereof will depend on the looked-for effect and on the dimensioning of the group (specific energy).

In a particular embodiment, said structure is a double-walled cylinder with a gap being provided between the walls and put into communication with said vent device.

In a variant, said structure comprises a smooth wall and a longitudinally corrugated wall of cylindrical symmetry. For example, the reentrant (concave) corrugations of the outer wall can be fixed to the inner wall and the empty gap is then constituted by the volume extending between the outward (convex) corrugations of the outer wall and the inner wall. The corrugation pitch should be small enough to impart the necessary stiffness to the structure.

Advantageously, said group is subdivided into at least two subgroups sandwiching said structure. This makes the structure easier to put into place. The subgroups are spiral-wound separately, with said structure acting as a mandrel for the subgroup on its outside. The structure must thus be capable of providing adequate strength against compression while the outer subgroup is being spiral-wound. If the diameter of the electrochemical group is large, it is possible to include therein a plurality of structures subdividing the group into as many subgroups as may be necessary.

In another embodiment of the invention, the cell also has a hollow mandrel that is permeable to gas and that is placed in the center of said group.

In a variant, the cell also includes means for securing the ends of said mandrel to end closure cups of said container.

The invention is particularly applicable to a non-aqueous organic electrolyte cell, in particular a lithium cell, having a positive electrode whose electrochemically active material is a lithium oxide of at least one transition metal, e.g. $LiNiO_2$, $LiMn_2O_4$, $LiCoO_2$, or mixtures thereof.

The invention is more particularly applicable to a "lithium-ion" lithium cell, having negative electrodes that comprise a lithium insertion material as the electrochemically active material. Such a generator has a negative electrode whose electrochemically active material is a carbon-containing material capable of inserting lithium into its structure and selected from: graphite, coke, carbon black, amorphous carbon, vitreous carbon, and mixtures thereof.

BRIEF DESCRIPTION OF THE DRAWINGS

Other characteristics and advantages of the invention appear from the following description. Reference is made to the accompanying drawings, in which:

FIG. 1 is a perspective diagram of a generator spool to which the first embodiment of the invention applies;

FIG. 2 is a perspective diagram of an inner envelope of a spool that allows gas to flow, in accordance with the first embodiment of the invention;

FIG. 3 is a fragmentary longitudinal section view of a cell constituting an application of the first embodiment of the invention;

FIG. 4 is an end view of an inner envelope spacer used in the embodiment of FIG. 3;

FIG. 5 is a fragmentary longitudinal section view of a cell constituting an application of a second embodiment of the invention;

FIG. 6 is a section through the structure used in the embodiment of FIG. 5;

FIG. 7 is a fragmentary perspective view of a modified inner envelope of a spool constituting a variant of the first embodiment of the invention; and FIG. 8 is a section view analogous to FIG. 3 through a cell constituting an application of a variant of the second embodiment of the invention.

MORE DETAILED DESCRIPTION

FIG. 3 is a section through a cell 1 comprising an outer cylindrical envelope or container 2 closed at both ends by respective cups 3 bonded to the inside wall of the envelope 2. The container 2 contains the electrochemical group or spool 4 constituted by electrodes 5 spiral-wound around a central well 6. At both ends of the spool 4 (cf. FIG. 1) there are provided connections, respectively a negative connection 7 (generally located towards the center of the spool), and a positive connection 8 (generally located towards the periphery of the spool).

The center of the cup 3 includes a rimmed orifice 9 enabling an electricity outlet terminal 11 of the cell to be housed and secured by means of an insulating ring 10 (e.g. made of glass), which terminal is electrically connected to the negative connection 7 of the spool 4.

The cup 3 also includes a gas vent device constituted by a safety vent 12 that is closed in normal operation by a capsule 13 which can break in the event of the internal pressure increasing above a predetermined threshold.

Insulating washers 14 and 15, automatically centered by the container 2 or the terminal 11 serve to insulate the various elements from one another.

In accordance with the invention, the spool 4 is held at a distance from the inside wall of the container 2 by a cylindrical inner confinement envelope 16 surrounding the spool 4 and allowing gas to pass through because it is permeable, porous, or preferably provided with multiple perforations 17 distributed over its periphery. The inner envelope 16 may be made of metal, as is the outer envelope 2, thereby enhancing heat exchange with the outside. It may also be made of plastic.

The gap between the inner envelope 16 and the container 2 may be defined by spacer rings 18 extending radially from place to place. As shown in FIG. 4, the centering spacer rings 18 are themselves perforated by holes 19 to allow gas to flow in the annular gap 20 left between the inner envelope 16 and the container 2.

As a result, if a gas-generating reaction should arise in an internal reaction zone 21 of the container, then the gas can escape into and along the annular gap 20, flowing along arrows 22 and 23 to reach the ends of the container 2 and escape via the safety vent 12, 13.

The number of rings 18 is sufficient to hold the spool 4 properly, but is kept small so as to avoid making the assembly too heavy. In general, three rings will be used for small-diameter spools, while a larger number of rings will be used to obtain an assembly that is more rigid when diameters are greater.

Instead of centering by means of radial rings, a variant of the first embodiment, shown in FIG. 7, provides for longitudinal spacers to be distributed circumferentially around the inner envelope 16. These spacers may advantageously be formed internally with the envelope 16 itself, being implemented by outer longitudinal ribs 24 on the envelope 16.

FIG. 5 shows another embodiment of the invention in which the means for collecting gas in order to vent it are constituted by a hollow cylindrical structure 40. The structure 40 subdivides the electrochemical group into an inner half-group 41 and an outer half-group 42. The structure 40 is made up of an inner wall 43 and an outer wall 44 which together define a gap 45 in which gas can be collected and conveyed towards vent 12. To facilitate such travel of the gas, the insulating washer 15" that is automatically centered by the container 2 preferably includes perforations that are advantageously situated in register with the structure 40. The walls 43 and 44 allow gas to pass by permeability, porosity, or preferably by multiple perforations 47 distributed around the periphery thereof.

In the variant shown in FIG. 6, the outer wall 44 is corrugated while the inner wall 43 is smooth. In order to impart greater rigidity to the structure 40, the corrugations 48 whose convex sides face inwards are secured to the inner wall 43, e.g. by adhesive or welding, and the corrugations 49 whose convex sides face outwards define the space 45 in the form of parallel longitudinal channels.

FIG. 8 shows another embodiment of the invention in which the spool 4 is no longer centered and held inside the container 2 by the outside of the perforated inner envelope 16, but instead by the inside of the spool 4. More precisely, the spool 4 is wound around a hollow mandrel 25 defining a central well 6. The hollow mandrel 25, e.g. implemented in the form of a perforated tube projects from each end of the spool 4 and is secured to an annular base 26 of the modified terminal 11' which is fixed to the cup 3 via two clamping washers 27 that clamp on an insulating gasket 28 having two lips that cover the edges of the central hole 9' in the cup 3. In this way, the mandrel 25, and thus the spool 4 it carries, is fixed to the two cups 3, i.e. it is fixed inside the container 2 so as to leave an annular gas-flow gap 20. FIG. 8 also shows two self-centered insulating washers 14' and 15'; in addition, since the terminal 11' is secured to the mandrel 25, it is made, at least in part, of insulating material so as to avoid a short circuit.

In a variant (not shown), the spool 4 is wound around a hollow mandrel 25 and comprises a structure 40 within its group that is held in the manner described above.

In another variant (not shown), the spool 4 is wound around the hollow mandrel 25 and includes a structure 40 within the group and a perforated inner envelope 16.

In a particular variant of the invention, which can be combined with the embodiments of FIGS. 3 or 8, the inner envelope 16 is electrically connected (e.g. by contact between the last turn of the spool 4 constituted by the electrode support on its own), to one of the poles (e.g. the negative pole if it is made of copper, nickel, or nickel-plated steel, etc.). The likewise metal container 2 is connected to the other pole (e.g. the positive pole if it is made of aluminum). Between the inner envelope 16 and the container 2, on the inner surface of the container, there is provided a thin insulating film (e.g. of polyethylene), which, without significantly reducing the space 20 devoted to collecting gas, makes it possible to avoid short circuiting in the event of one of the envelopes 16 and 12 being slightly deformed.

On safety grounds, the spacers are preferably made of insulating material. The advantage is that in the event of a short circuit created by the container being compressed or pierced by a piece of metal, electricity will be diverted by the contact between the two envelopes, thereby making it possible to avoid excessive heating of the electrodes.

In analogous manner, the structure 40 of FIG. 3 and/or the mandrel 25 may advantageously be made of a metal material so as to contribute to conveying and dumping heat produced in the spool 4. For example, the structure 40 may be made of aluminum and connected to the positive poles of the electrodes surrounding it.

We claim:

1. A sealed electrochemical cell comprising:
   a containers;
   a spiral-wound electrochemical group contained in said container;
   a vent provided in said container, and through which a gas escapes to an outside of said container during an internal pressure rise;
   a holder provided in said container, for holding said group, and organized so as to create a gap between said group and an inner wall of said container to allow said gas to flow; and
   wherein said group comprises a positive electrode whose electrochemically active material is a lithium-containing oxide of at least one transition metal.

2. A cell according to claim 1, in which said holder has a wall that allows said gas to pass therethrough, such that said gap puts an outer surface of said group into communication with said vent device.

3. A cell according to claim 2, wherein said holder is a perforated envelope enclosing said group.

4. A cell according to claim 2, further comprising spacers disposed between said holder and said container.

5. A cell according to claim 4, wherein said spacers comprise perforated radial rings.

6. A cell according claim 4, wherein said spacers comprise longitudinal spacers.

7. A cell according to claim 5, wherein at least one of said spacers is integrally formed with said holder.

8. A cell according to claim 2, further comprising:
   an insulating film provided on an inside surface of said container;
   wherein said holder and said container are connected to two opposite poles.

9. A cell according to claim 1, wherein said group comprises a negative electrode whose electrochemically active material is a carbon-containing material capable of inserting lithium into its structure, and selected from the group consisting of graphite, coke, carbon black, amorphous carbon, vitreous carbon, and mixtures thereof.

10. A cell according to claim 2, further including a hollow mandrel placed in a center of said group, said mandrel having a wall that allows said gas to pass therethrough.

11. A cell according to claim 10, further including means for securing the ends of said mandrel to end closure cups of said container.

12. A sealed electrochemical cell comprising:
    a container;
    a spiral-wound electrochemical group contained in said container;
    a vent provided in said container, and through which a gas escapes to an outside of said container during an internal pressure rise; and
    a hollow walled structure, having a wall that allows said gas to pass therethrough, and provided in a thickness of said group to create a gap that puts said group into communication with said vent.

13. A cell according to claim 12, in which said group is subdivided into at least two subgroups on either side of said structure.

14. A cell according to claim 12, in which said structure is a double-walled cylinder, which is coaxial with said group.

15. A cell according to claim 14, in which said structure comprises a first cylinder having a smooth wall, and a second cylinder having a wall that is corrugated longitudinally with cylindrical symmetry, said first and said second cylinders coaxially arranged.

16. A cell according to claim 12, wherein said wall of said hollow walled structure allows said gas to pass therethrough via one of permeability, porosity, and perforations.

17. A cell according to claim 12, wherein said hollow walled structure has a cylindrical shape, and is coaxial with said group.

* * * * *